United States Patent Office 3,705,081
Patented Dec. 5, 1972

3,705,081
METHOD FOR PRODUCING NICOTINAMIDE ADENINE DINUCLEOTIDE
Kiyoshi Nakayama, Sagamihara-shi, Japan, assignor to Kyowa Hakko Kogyo Co., Ltd., Tokyo, Japan
No Drawing. Continuation of application Ser. No. 656,687, July 28, 1967. This application June 13, 1968, Ser. No. 736,584
Claims priority, application Japan, July 29, 1966, 41/49,398
Int. Cl. C12d *13/06*
U.S. Cl. 195—28 N          7 Claims

ABSTRACT OF THE DISCLOSURE

The present disclosure relates to a method for producing nicotinamide adenine dinucleotide in high yields which comprises culturing a microorganism capable of producing nicotinamide adenine dinucleotide in an aqueous nutrient medium under aerobic conditions in the presence of pantothenic acid, β-alanine or coenzyme A and mixtures thereof. Examples of microorganisms which can be used in the present process are those belonging to the genera Brevibacterium, Corynebacterium and Arthrobacter.

---

This application is a continuation of copending application Ser. No. 656,687, filed on July 28, 1967 and now abandoned.

The present invention relates to a process for producing nicotinamide adenine dinucleotide in high yields. More particularly, the present invention concerns a process for producing nicotinamide adenine dinucleotide by fermentation in the presence of pantothenic acid, β-alanine or coenzyme A and mixtures thereof.

Nicotinamide adenine dinucleotide can be found in yeasts, molds, bacteria and so on. A process for producing said compound by extracting yeasts from cell bodies and purifying them is well known.

Nicotinamide adenine dinucleotide is a compound having an important role in bio-chemical reactions. It also finds utility in the alcoholic fermentation of glucose. Nicotinamide adenine dinucleotide is also known as coenzyme I, dehydrogenase I, cozymase, and diphosphopyrimidinenucleotide. Nicotinamide adenine dinucleotide has the following structural formula:

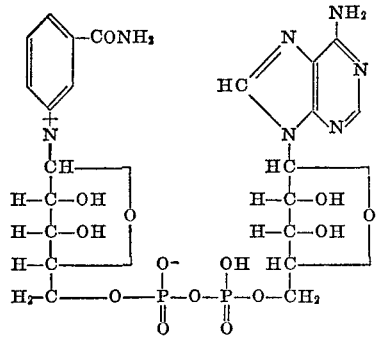

One of the objects of the present invention is to provide a process for producing nicotinamide adenine dinucleotide by a fermentation process on an industrial scale.

Another object of the present invention is to provide a process for the preparation of nicotinamide adenine dinucleotide in high yields.

Other objects and further scope of applicability of the present invention will become more apparent from the detailed description given hereinafter; it should be understood, however, that the detailed description and specific examples while indicating preferred embodiments of the present invention, are given by way of illustration only, since various changes and modifications within the spirit and scope of the invention will become apparent to those skilled in the art from this detailed description.

Pursuant to the present invention, it has been found that the amount of nicotinamide adenine dinucleotide produced by the present fermentation process can be significantly increased by conducting the fermentation in a culture medium containing pantothenic acid, β-alanine or coenzyme A or mixtures thereof. It is not known what mechanism is involved when these compounds are added to the fermentation medium. However, it is readily apparent from the examples hereinbelow that the presence of these compounds makes a substantial difference in the amount of nicotinamide adenine dinucleotide produced. Accordingly, it is illogical to conclude that the action of these compounds is the secondary effect of the action of the microorganism employed working as a growing factor. The concept of increasing the yield of nicotinamide adenine dinucleotide by culturing nicotinamide adenine dinucleotide-producing organisms in a fermentation medium containing pantothenic acid, β-alanine or coenzyme A and mixtures thereof has never heretofore been known or even remotely suggested in the prior art.

The microorganisms which can be used in the process of the present invention include all of those which are capable of producing nicotinamide adenine dinucleotide. Typical microorganisms which can be employed are yeasts, bacteria, ray fungi and molds. Bacteria belonging to the genera Brevibacterium. Corynebacterium and Arthrobacter are particularly effective in producing increased yields of nicotinamide adenine dinucleotide upon the addition of pantothenic acid, β-alanine or coenzyme A.

The fermentation medium comprises either a synthetic culture medium or a natural nutrient medium which contains the essential nutrients for the growth of the microorganisms employed. Such fermentation medium generally contains a carbon source such as a carbohydrate as well as other nutrients which are well known in the art such as, for example, a nitrogen source, inorganic compounds and the like which are utilized by the microorganism employed in specific amounts.

The carbohydrates which can be used in the process of the present invention include, for example, glucose, fructose, maltose, sucrose, starch, starch hydrolysate, molasses, and the like. Small amounts of other suitable carbon sources such as glycerol, mannitol, sorbitol, organic acids, hydrocarbons, etc., may be used in the fermentation medium along with the carbohydrates. The carbohydrates may be used either singly or in mixtures of two or more and any small amount of other carbon sources may also be present either singly or in mixtures of two or more.

The inorganic compounds which can be employed in the fermentation medium of the present invention include inorganic phosphates, for example, potassium phosphate, ammonium phosphate, etc., and other inorganic materials such as magnesium sulfate, iron sulfate or other iron salts, potassium chloride, magnesium chloride, calcium chloride, etc.

As a nitrogen source, various kinds of inorganic or organic salts or compounds, such as, urea or ammonium salts, such as, ammonium chloride, ammonium sulfate, ammonium nitrate, ammonium phosphate, etc., or one or more than one amino acid mixed in combination or natural substances containing nitrogen, such as corn steep liquor, yeast extract, meat extract, fish meal, peptone, bouillon, casein hydrolysates, fish solubles, rice bran extract, etc., may be employed. These substances may also be used either singly or in combinations of two or more. It may also be necessary to add certain essential nutrients to the culture medium, depending upon the particular microorganism employed, such as, amino acids, for example, aspartic acid, threonine, methionine, etc., and/or vitamins, for example, biotin, thiamine, cobalamin and the like.

Pantothenic acid, β-alanine or coenzymne A which are added to the fermentation medium according to the present process may be added to said medium as compounds per se or appropriate salts of these compounds and, furthermore, may be supplied in the form of natural substances containing these compounds. According to the present process, pantothenic acid is added to the culture medium in an amount of about 100 micrograms per liter to 20 milligrams per liter; β-alanine is added in an amount of about 300 micrograms per liter to about 30 milligrams per liter; and coenzyme A is added in an amount of 1 milligram per liter to 50 milligrams per liter. If these compounds are used in combination, the amount of each compound added is proportionately smaller depending upon the particular combination.

Fermentation is conducted under aerobic conditions, such as, aerobic shaking of the culture or with stirring of a submerged culture, an incubation temperature of about 20° to 40° C. and a pH of about 5 to 9 being preferable. Remarkably large amounts of nicotinamide adenine dinucleotide are found to be accumulated in the fermentation liquor.

Other conditions of temperature and pH may also be used with lower yields.

After the completion of the fermentation, the nicotinamide adenine dinucleotide may be separated from the culture liquor by conventional means, such as ion exchange resin treatment, precipitation with metallic salts, extraction methods, conventional adsorption methods, chromatography and the like.

The following examples are given merely as illustrative of the present invention and are not to be considered as limited. Unless otherwise noted, the percentages in the application and in the examples are by weight.

EXAMPLE 1

*Brevibacterium ammoniagenes* ATCC 6872 is used as the seed bacterium. It is cultured at 30° C. for twenty-hour hours in a seed medium consisting of 2% glucose, 1% peptone, 1% yeast extract, 0.3% sodium chloride and 30 micrograms per liter of biotin.

The fermentation medium employed has the following composition:

100 grams glucose
6 grams urea
10 grams $K_2HPO_4$
10 grams $KH_2PO_4$
10 grams $MgSO_4 \cdot 7H_2O$
2 grams meat extract
30 micrograms of biotin per liter of the culture medium 1 ml. of a 12% solution of urea is separately sterilized and added to 19 ml. of the fermentation medium which was previously sterilized in an autoclave under the conditions of 1 kg./cm.² for ten minutes.

The seed culture is inoculated into the fermentation medium in an amount of 10% by volume thereof. The mixture of media is then poured in 20 milliliter portions into individual 250 milliliter conical flasks. To the fermentation medium is added various amounts of calcium pantothenate, β-alanine or coenzyme A or mixtures thereof. After sterilization under pressure, fermentation is carried out with aerobic shaking of the culture at 30° C. After 48 hours of culturing, adenine and nicotinamide are added to the fermentation medium to give a concentration of 2 mg./ml. After an additional 48 hours of culturing, nicotinamide adenine dinucleotide is produced in the culture liquor. The nicotinamide adenine dinucleotide is then recovered from the culture liquor by an ion-exchange treatment. The following table shows the amount of nicotinamide adenine dinucleotide produced when various amounts of calcium pantothenate, β-alanine or coenzyme A are added to the fermentation medium. These results are compared to the situation where there is no addition of these compounds to the fermentation medium. As can be readily seen from Table 1, there is a substantial increase in the amount of nicotinamide adenine dinucleotide produced when calcium pantothenate, β-alanine or coenzyme A are added to the fermentation medium.

TABLE 1

| Addition to the basal medium: | Mg./ml.[1] |
|---|---|
| No addition | 0.4 |
| Calcium pantothenate: | |
| 100 μg./l. | 2.9 |
| 2 mg./l. | 3.1 |
| 12 mg./l. | 4.3 |
| 20 mg./l. | 2.8 |
| β-Alanine: | |
| 380 μg./l. | 3.1 |
| 7.5 mg./l. | 3.8 |
| 30.0 mg./l. | 2.4 |
| Coenzyme A: | |
| 1 mg./l. | 2.1 |
| 10 mg./l. | 3.5 |
| 30 mg./l. | 3.5 |
| 50 mg./l. | 2.1 |

[1] Amount of nicotinamide adenine dinucleotide produced.

EXAMPLE 2

This example follows the same procedure as Example 1 except that Corynebacterium sp. No. 3485, ATCC 21084 is the microorganism employed. The amount of nicotinamide adenine dinucleotide produced is shown in Table 2.

TABLE 2

| Addition to the basal medium: | Mg./ml.[1] |
|---|---|
| No addition | 0.7 |
| Calcium pantothenate, 12 mg./l. | 2.1 |
| β-alanine, 7.5 mg./l. | 2.0 |
| Coenzyme A, 30 mg./l. | 1.8 |

[1] Amount of nicotinamide adenine dinucleotide produced.

EXAMPLE 3

This example follows the same procedure as Example 1 except that Arthrobacter sp. No. 3486, ATCC 21085 is the microorganism employed. The amount of nicotinamide adenine dinucleotide produced is shown in Table 3.

TABLE 3

| Addition to the basal medium: | Mg./ml.[1] |
|---|---|
| No addition | 0.6 |
| Calcium pantothenate, 12 mg./l. | 2.1 |
| β-alanine, 7.5 mg./l. | 1.6 |
| Coenzyme A, 30 mg./l. | 1.8 |

See footnote in Table 2.

As can be readily seen by referring to the above examples and tables, the amount of nicotinamide adenine dinucleotide produced is substantially increased upon the addition of pantothenic acid, β-alanine, or coenzyme A or mixtures thereof to the fermentation medium.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing nicotinamide adenine dinucleotide which comprises culturing a nicotinamide adenine dinucleotide-producing microorganism belonging to a genus selected from the group consisting of Corynebacterium and Arthrobacter in an aqueous nutrient medium under aerobic conditions in the presence of at least one additive selected from the group consisting of pantothenic acid, β-alanine and coenzyme A, accumulating nicotinamide adenine dinucleotide in the resultant culture liquor and isolating the nicotinamide adenine dinucleotide therefrom.

2. The process of claim 1 wherein the microorganism is Corynebacterium sp. No. 3485, ATCC 21084.

3. The process of claim 1, wherein the microorganism is Arthrobacter sp. No. 3486, ATCC 21085.

4. A process for producing nicotinamide adenine dinucleotide which comprises culturing a nicotinamide adenine dinucleotide-producing microorganism belonging to a genus selected from the group consisting of Corynebacterium and Arthrobacter in an aqueous nutrient medium under aerobic conditions in the presence of at least one additive selected from the group consisting of pantothenic acid, β-alanine, and coenzyme A in amounts of about 100 micrograms per liter to 20 milligrams per liter, about 300 micrograms per liter to 30 milligrams per liter and about 1 milligram per liter to 50 milligrams per liter, respectively, accumulating nicotinamide adenine dinucleotide in the resulting culture liquor and isolating the nicotinamide adenine dinucleotide therefrom.

5. The process of claim 4, wherein the microorganism is cultured under aerobic conditions at a temperature of about 20° to 40° C. and a pH of about 5 to 9.

6. The process of claim 4, wherein said microorganism is Corynebacterium sp. ATCC 21084.

7. The process of claim 4, wherein said microorganism is Arthrobacter sp. ATCC 21085.

References Cited

UNITED STATES PATENTS

| | | | |
|---|---|---|---|
| 3,212,994 | 10/1965 | Kono et al. | 195—47 |
| 3,268,415 | 8/1966 | Kinoshita et al. | 195—28 N |
| 3,368,947 | 2/1968 | Nakayama et al. | 195—28 N |

ALVIN E. TANENHOLTZ, Primary Examiner

U.S. Cl. X.R.

195—114